United States Patent Office 3,405,474
Patented Oct. 15, 1968

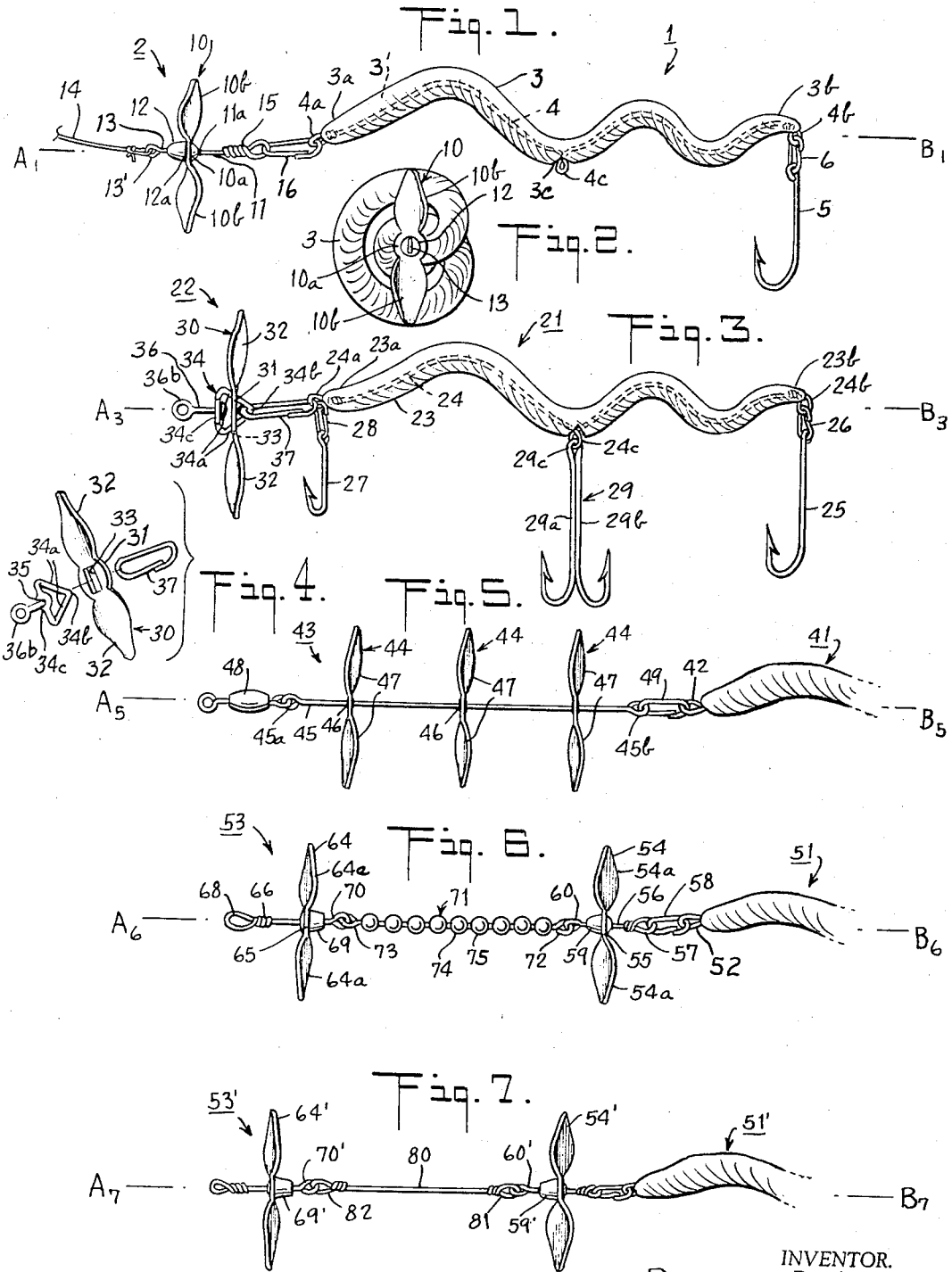

3,405,474
FISH LURE AND ACTUATOR
Robert B. Lewis, R.D. 1, Sussex, N.J. 07461
Filed Dec. 10, 1965, Ser. No. 513,027
4 Claims. (Cl. 43—26.2)

ABSTRACT OF THE DISCLOSURE

An actuator mechanism for driving a fish lure involving a propeller blade which is slotted and through which a link passes which turns with the blade. One end of the link is adapted to be attached to the lure and the other end of the link is adapted to be attached to a swivel connection.

This invention relates to fiish lures and to an actuator for use with a fish lure which imparts lifelike motion to the lure as it is moved relatively to water.

An artificial fish lure is known to be more effective when it simulates the motion of live bait when the lure is placed in a water current, or as the lure is drawn through water, such as while trolling or when retrieving from a cast. Numerous fish lures have been proposed heretofore which have this effect. Many of the prior art lures, however, undergo such erratic movement that the simulation of lifelike movement is not attained; conversely, others of the prior art lures do not produce a sufficient amount of automatic, lifelike movement. A problem which frequently arises with prior art lures which are intended to simulate lifelike motion is that the motion of the lure twists the line to which the lure is connected, causing it to foul.

The fish lure of the invention overcomes these and other disadvantages of the prior art devices and includes an actuator of improved characteristics which may be attached to a lure body and which effectively and efficiently imparts simulated, lifelike motion to the lure body. The actuator of the invention, in representative embodimnets, includes a detachable connection to the lure body whereby the actuator may be used interchangeably with various lure bodies, comprising either live or artificial bait. Means are included for eliminating or substantially reducing any tendency of the actuator and line body, due to the motion thereof, to twist the line to which the actuator is connected.

It is therefore an object of this invention to provide an actuator for a fish lure which imparts lifelike motion to the lure body.

Another object of this inevntion is to provide an actuator for a fish lure which imparts lifelike motion to the lure body and which is detachably connected to the lure body.

A further object of this invention is to provide an actuator for a fish lure which imparts lifelike motion to the lure body and which includes means for eliminating or substantially reducing the tendency of the actuator and lure body, due to the motion thereof, to twist a line to which the actuator is connected.

Still another object of this invention is to provide a fish lure of improved construction which simulates the motion of live bait as the lure is moved through water.

Still a further object of this invention is to provide a fish lure of improved construction which is low in cost.

These and other objects of the invention will be readily apparent to those skilled in the art. For a better understanding of the invention, reference may be had to the following description and drawings in which:

FIG. 1 is a side elevational view of a fish lure including an actuator and a lure body;

FIG. 2 is an end view of the fish lure of FIG. 1;

FIG. 3 is a side elevational view of another fish lure including an actuator and a lure body;

FIG. 4 is an exploded, perspective view of the actuator of FIG. 3;

FIG. 5 is a side elevational view of another fish lure including an actuator and a lure body;

FIG. 6 is a side elevational view of another fish lure including an actuator and a lure body; and FIG. 7 is a side elevational view of another fish lure including an actuator and a lure body.

A first fish lure is shown in a side elevational view in FIG. 1 and in an end view in FIG. 2. The fish lure includes a lure body 1 and an actuator 2. The body 1 comprises a sleeve 3 formed of soft plastic or other material closely resembling the physical characteristics of a live worm, both in external appearance and in its pliability, consistency and surface texture. The sleeve 3 includes a hollow, axial passage 3' throughout its length. A length of stiffly flexible, bendable wire 4, substantially coextensive in length with the sleeve 3, is inserted through the passage 3'.

The body 1 preferably is formed into a helical configuration by bending the wire 4 into a helix about axis $A_1$–$b_1$. The radius and pitch of the helix is determined by the bending, and may be changed at will; conveniently, the wire 4, with or without the sleeve 3 received over it, may be formed into a helix by being bent around a cylindrical object such as a pencil, of approximately the desired diameter of the completed, helical body 1. As noted, the wire 4 is stiffly flexible, and therefore normally retains the helical configuration; however, should the helical configuration of the lure body 1 become distorted, for example as a result of impact with a solid object, the helical configuration may readily be reproduced by bending the wire 4. When maintained in a helix, the lure body 1 is rotatable about the axis $A_1$–$B_1$ in a relatively stable manner, providing simulated lifelike motion without any undesirable amount of erratic motion.

Loops 4a and 4b are formed on the opposite ends of the wire 4 and are substantially recessed within head 3a and end 3b, respectively, of the worm body 3 for concealment; the loops 4a and 4b may project outwardly a short distance, however, to be accessible. An intermediate loop 4c is formed in the wire 4 and is accessible through a slot 3c in the side of the sleeve 3. A single barbed hook 5 is attached to the end loop 4b by a snap connector 6; if desired, hooks may also be attached to the intermediate loop 4c and/or to the front loop 4a in an identical manner.

The actuator 2 includes a propeller 10 having a flat central portion 10a and a pair of blades 10b. Preferably, the propeller is stamped from a flat sheet of metal and a small aperture (not shown) is formed in the center of the central portion 10a. The actuator 2 further includes a swivel connection fixed to the propeller 10, and which may be of a commercially available type including a bullet-shaped hub 12 and a pair of axially aligned, independently rotatable shafts 11 and 13 projecting from the rear and the front ends, respectively, of the hub 12. The shaft 13 is carried by but is free to rotate with respect to the hub 12. The shaft 11 is passed through the central aperture in the portion 10a of the propeller. The rear end of the hub 12 engages the central portion 10a. The hub 12 is then welded to the central portion 10a, as indicated by the weld bead 12a, and the shaft 11 is welded to the rear end of the hub 12, as indicated by weld bead 11a. A connection loop 15 is formed at the free end of the shaft 11 and a connection loop 13' is provided on the free end of the shaft 13, the latter providing for connection of the actuator 2 to a line 14. The completed structure of the actuator 2 therefore provides for a propeller 10 having pitched blades 10b for effecting rotation of the propeller 10 in response to fluid pressure and concomitantly effecting rotation of the shaft 11 and its connection loop 15; the shaft 13 is rotatably connected to the hub 12, and thus may remain stable, or nonrotating, when the propeller 10 is rotating.

The actuator 2 is symmetrically disposed about and axially aligned with the axis $A_1$–$B_1$ and the blades 10b extend in diametrically opposed relationship from the central portion 10a and are of equal size and pitch. The actuator 2 therefore undergoes relatively stable rotation about the axis $A_1$–$B_1$. As an alternative to the two blades 10b, there may be employed three or more blades disposed in equiangular relationship about the central portion 10a.

A snap connector 16 is inserted through the loop 15 of the shaft 11 and through the attachment loop 4a of the wire 4 to detachably connect the actuator 2 to the lure body 1. The snap connector 16 provides a relatively loose coupling, causing the lure body 1 to be rotatably driven by the actuator 2 but permitting a small degree of freedom for nonrotary motion of the lure body 1, thereby enhancing the simulation of motion of live bait. The speed at which the lure body 1 rotates in response to a given fluid pressure may be adjusted in either or both of two techniques. In accordance with a first technique, the pitch of the blades 10b of the actuator 2 may be changed by twisting the blades 10b by finger or with a pair of pliers; in accordance with a second technique, the pitch, diameter, and length of the helical lure body 1 may be adjusted by suitable bending of the wire 4. The desired speed of rotation is best determined in use, and the ease of adjusting the lure to attain the proper speed of rotation provides great versatility in the lure of the invention.

The actuator 2 may be detached from the lure body 1 due to the detachable connection provided by snap connector 16. The actuator 2 may therefore be employed with lure bodies other than the lure body 1 disclosed. In addition, the worm-like sleeve 3 may be removed from the wire 4 and live bait, such as a live worm, may be threaded onto the wire 4 in the same manner as the sleeve 3.

In FIG. 3 a fish lure is shown and includes a lure body 21 and an actuator 22. The lure body 21 comprises a hollow worm-like body 23 which is substantially identical to the worm body 3 of FIG. 1 and has a wire 24 received therein. The wire 24 is stiffly flexible and is formed into a helix about axis $A_3$–$B_3$. The wire 24 includes a loop 24a providing an attachment means at the front end 23a of the worm 23, a second loop 24b at the rear end 23b of the worm, and a loop 24c disposed at an intermediate portion of its length. It is preferred that the loops such as 24a, 24b and 24c be substantially encased within the worm body 23 and thereby concealed.

Single barbed hooks 25 and 27 are attached to the rear and front loops 24b and 24a by snap connectors 26 and 28, respectively. A double barbed hook 29 including hooks 29a and 29b joined by a U-shaped bend 29c is attached to the intermediate loop 24c by slipping one of the hooks 29a or 29b through the loop 24c; the U-shaped bend 29c resiliently urges the shanks of the hooks 29a and 29b together, locking the hook 29 on the loop 24c. Hooks of other suitable configurations may be employed as an alternative to the hooks 25, 27 and 29 and more hooks may be attached to the rigid wire 24 by the provision of more intermediate loops in the wire 24 at any desired position along the length of the worm body. It is important, however, that the hooks not be of a size or configuration which would prevent the intended rotary motion of the body 21 or the action of the actuator 22 in providing the motion. The body 1 of FIG. 1 may also carry one or more additional hooks by attachment to the wire 4, in the manner indicated in the embodiment of FIG. 3.

Referring concurrently to FIGS. 3 and 4, the actuator 22 includes a propeller 30 rotatable about an axis aligned with the axis $A_3$–$B_3$. The propeller 30 includes a central portion 31 and a pair of blades 32 extending from diametrically opposite sides of the central portion 31. An elongated slot 33 is centrally disposed in the central portion 31. A triangular shaped link 34 includes a pair of legs 34a defining vertex 34b of the loop 34 and a front or base leg 34c having a central aperture 35 therein. A swivel shank 36 is received through the aperture 35 and the enclosed end is peened over to retain the shank 36 for rotation relatively to the link 34. The other end of shank 36 is formed in a loop 36b to provide attachment to a line.

The apex 34b of the link 34 is inserted through the slot 33; the length of the slot 33 is determined in accordance with the divergence of the legs 34a such that the apex 34b barely protrudes beyond the rear surface of the central portion 31. A snap connector 37 is forced through the space between the legs 34a at the apex 34b and the rear surface of the central portion 31, thereby causing the propeller 30 to be rigidly secured to the loop 34. The propeller 30 and the link 34, and the snap connector 37 thereby are rotatable in fixed relationship relatively to the shank 36 about the axis $A_3$–$B_3$.

The lure of FIG. 3 operates in a manner substantially identical to that of the lure of FIG. 1. The propeller 30 of the actuator 22 is caused to rotate in response to fluid pressure on the blades 32, thereby rotating the snap connector 37 and driving the lure body 21 in rotation to simulate the action of live bait. The swivel connection between shank 36 and the link 34, however, permits the shank 36 to remain stationary during the rotation of both the actuator 22 and the lure body 21 to prevent twisting of a line attached to the shank 36.

FIG. 5 shows another fish lure including a lure body 41 which may be of the types shown in FIGS. 1 and 3, and including an attachment loop 42 at the front end thereof. An actuator 43 is provided for rotating the lure body 41; the actuator 43 includes a plurality of propellers 44 fixedly mounted on a shaft 45 aligned on axis $A_5$–$B_5$. The number of propellers 44 may be varied as desired, and in the present actuator 43 there are provided three propellers 44. By increasing the number of propellers, in accordance with FIG. 5, the torque developed by the actuator is increased, relatively to an actuator employing a single propeller, such as in FIGS. 1 to 4, of the same size. The actuator of FIG. 5 may therefore drive a given size lure at a higher speed, or a larger lure at the same speed, relative to the actuators of FIGS. 1 to 4.

Each of the propellers 44 includes a central portion 46 centered on the axis $A_5$–$B_5$ and a pair of equally pitched blades 47 extending radially from the shaft 45 and from diametrically opposite sides of the central portion 47. The shaft 45 includes a connector loop 45a for attachment through a swivel 48 to a line (not shown). The shaft 45 includes a second loop 45b at its opposite end adapted for connection by a detachable snap connector 49 to the attachment loop 42 of the lure body 41.

The blades 47 of the propellers 44 are pitched in an identical manner such that, in response to fluid pressure, the blades will rotate the shaft 45 about the axis $A_5$–$B_5$ for rotating the lure body 41 to simulate the action of live bait. As an alternative to the two blades 47 of each propeller 44 as shown, there may be employed three or more blades equiangularly disposed about the central portion 46 and of equal pitch. The swivel 48 operates to substantially prevent any twisting of the line as a result of the rotation of the actuator 43 and the lure body 41.

Each of the fish lures of the preceding FIGS. 1 to 5 includes a swivel connector for joining the actuator of the lure to a line. Swivel connectors are not completely satisfactory, however, since unavoidable frictional coupling through the connector frequently causes the rotary motion of the actuator to be coupled to, and to twist the line. The fish lures shown in FIGS. 6 and 7 include improved actuators which substantially eliminate undesirable twisting of a line to which the actuator and lure are connected. The actuators of FIGS. 6 and 7 each include a stabilizing propeller which opposes a driving propeller and which thereby prevents unavoidable frictional coupling through swivel connections from twisting the line.

The fish lure of FIG. 6 includes a lure body 51 which may be identical to the lure body 1 of FIG. 1 and which has an attachment loop 52 at its front end. Actuator 53 includes a driving propeller 54 and a stabilizing propeller 64. The propellers 54 and 64 are constructed for rotation about a common axis $A_6$–$B_6$; the blades 54a of the propeller 54 are pitched in an opposite direction relative to that of the blades 64a of the propeller 64, whereby the propellers 54 and 64, respectively, rotate in opposite directions.

The propellers 54 and 64 include swivel connections and attachment loops constructed in an identical manner to those of the propeller 10 of the actuator 2 in FIG. 1. Hubs 59 and 69 are secured to the central portions 55 and 65 of the propellers 54 and 64, respectively, and are positioned in opposed axial relationship. Shafts 60 and 70 are rotatably secured within the hubs 59 and 69 and include attachment loops on their free ends which are joined to the end loops 72 and 73 of a beaded chain 71. The beaded chain 71 is a commercially available item; each bead, such as bead 74, is free to rotate relatively to the next adjacent bead, such as bead 75. The beaded chain 71 cooperates with the swivel connections of the propellers 54 and 64 to reduce frictional coupling between the driving propeller 54 and the stabilizing propeller 64, and thus to permit the driving propeller 54 to rotate relatively independently of the stabilizing propeller 64.

The driving propeller 54 includes a shaft 56 having a loop 57 at its free end which is coupled by snap connector 58 to the attachment loop 52 of the lure body 51. The stabilizing propeller 64 includes a shaft 66 having a loop 68 at its free end which provides for attachment to a line (not shown). The pitch of the blades 54a is of an amount sufficient to provide a desired rate of rotation of the lure body 51.

In spite of the use of the beaded chain 71 and the swivel connections of hubs 59 and 69, a rotational torque is transmitted by frictional coupling from the driving propeller 54, during its rotation, to the stabilizing propeller 64. In the absence of the stabilizing propeller 64, this frictionally coupled torque would be applied to the line (not shown), tending to twist and foul it. The oppositely directed pitch of the blades 64a of the stabilizing propeller 64, relatively to the blades 54a of the driving spinner 54, however, causes the stabilizing propeller 64 to develop a torque tending to rotate it in a direction opposite to that of the driving propeller 54 in response to the application of an identical fluid pressure to each of the propellers 54 and 64. By properly designing the pitch of the blades 64a and the size thereof, the amount of torque developed by the stabilizing propeller 64 may be limited to be equal to, and thus sufficient to oppose the oppositely directed, frictionally coupled rotational torque from the driving propeller 54. As a result, the stabilizing propeller 64 will remain substantially nonrotational, thereby eliminating twisting of a line (not shown) connected to the loop 68 of shaft 66.

It should be appreciated that variations in the tension exerted on the beaded chain 71 and the swivel connections to the propellers 54 and 64 will result in variations in the amount of frictional coupling between the propellers 54 and 64. Preferably, an average preselected value of frictionally coupled torque corresponding to an average fluid pressure and tension on the actuator 53 is determined; the pitch and size of the blades 64a of the stabilizing propeller 64 then is designed to develop a torque just sufficient to counteract the average value of frictionally coupled torque from the driving propeller 54, whereby the stabilizing propeller 64 does not rotate at all when subjected to the preselected value of fluid pressure.

When the fluid pressure, and thus the frictional coupling, is increased above the average value, the frictionally coupled torque exceeds the oppositely directed torque of the stabilizing propeller 64 and the latter is rotated in the same direction as the driving propeller 54, thereby twisting the line in a first direction. When the frictional coupling is decreased below the average value, however, the torque developed by the stabilizing propeller 64 exceeds the oppositely directed, frictionally coupled torque, and the stabilizing propeller 64 rotates in the direction defined by the pitch of its blades 64a, twisting the fish line in a second direction, opposite to the first direction.

Therefore, although occasional twisting of the line in first and second, opposite directions may occur, the net effect is that the opposite directions of twisting substantially cancel one another, whereby deleterious twisting of the line to an extent causing it to foul is substantially eliminated. The desired rotation of the lure body 51, however, is achieved continuously due to the action of the driving propeller 54. As an alternative to the construction of FIG. 6, fixed shafts may be joined to the central portion 55 and 65 of the propellers 54 and 64, respectively, in place of the hubs 59 and 69. This alternative construction is permitted due to the swivel connection provided by the beaded chain 71.

In the construction shown in FIG. 7, elements identical to those shown in FIG. 6 are indicated by identical but primed numerals. The lure includes a lure body 51' and an arcuator 53'. Actuating propeller 54' and stabilizing propeller 64' include swivel connections comprising hubs 59' and 69' having shafts 60' and 70', respectively, rotatably secured therein. Connection loops are formed on the free ends of the shafts 60' and 70'. A length of wire 80 joins the propeller 54' and 64', the wire 80 preferably being substantially rigid. The wire 80 includes loops 81 and 82 formed on its opposite ends which are connected to the loops of the shafts 60' and 70', respectively.

The blades of the propeller 64' are formed to have a pitch whereby the torque developed by the propeller 64' is equal to and opposes the torque applied thereto by frictional coupling to the propeller 54'. The actuator 53' therefore operates in a manner substantially identical to that of the actuator 53 of FIG. 6. However, the rigid wire 80 causes a greater torque to be applied to the stabilizing propeller 64', as compared with the torque coupled through the beaded chain 71 in the actuator 53 of FIG. 6. As a result, for a common pitch of the blades of the actuating propellers 54 and 54', and for a given fluid pressure, the blades of the stabilizing propeller 64' must have a greater pitch than the blades of the stabilizing propeller 64. As noted previously, the adjustment of the pitch of the blades is readily accomplished by appropriately bending the blades of the propellers by hand or by a tool, such as a pair of pliers.

In the lures of FIGS. 6 and 7, only a single actuating propeller and a single stabilizing propeller have been shown and described. As an alternative, two or more actuating propellers may be employed, in accordance with the lure shown in FIG. 5; similarly, two or more stabilizing propellers may also be employed. The particular configuration of the propellers is not limited to the forms shown and described herein. As noted above, the propellers may include three or more blades equiangularly disposed about a central portion of the propeller. The only limiting requirement is that the propellers be rotatable about a relatively stable axis of rotation; similarly, the lure body must also be rotatable about the same axis of rotation for achieving maximum benefit from the invention.

In summary, the fish lures of the invention are very low in cost, are easy to assemble and use, and are highly effective in simulating the action of live bait. The detachable connection of the actuators to the lure bodies permits the use of a single actuator with a plurality of interchangeable lure bodies. The actuators of the invention also provide means for reducing and/or substantially eliminate twisting and fouling of the line while providing the desired rotary motion of the lure body.

What is claimed as new and desired to be secured by U.S. Letters Patent is:

1. An actuator for imparting rotation motion to a lure body comprising:
   (a) a propeller rotatable about an axis of rotation in response to fluid pressure; and
   (b) means on said propeller and extending along the axis for connecting the propeller to the lure body for driving the lure body in common rotation therewith, wherein;
   (c) said connecting means comprises a link having diverging legs defining a vertex of a loop, and a base leg opposite said vertex and joining said diverging legs;
   (d) a central portion of said propeller includes an elongated slot approximately equal in width to the thickness of said diverging legs; and
   (e) said diverging legs extend through said slot from one side of said central portion and engage said central portion at the opposite ends of said slot and said vertex projects beyond the opposite side of said central portion; and there is further provided
   (f) a detachable loop connector for connecting said actuator to a lure body, said connector being received through said link at said vertex and closely engaged between said diverging legs and said opposite side of said central portion to fix said link to said propeller.

2. An actuator as recited in claim 1 wherein:
   (a) said base leg includes a central aperture aligned on said axis; and there is further provided
   (b) a shank received through said aperture in said base leg in alignment with said axis and rotatably secured to said link.

3. An actuator for imparting rotation motion to a lure body comprising:
   (a) a propeller rotatable about an axis of rotation in response to fluid pressure; and
   (b) means on said propeller and extending along the axis for connecting the propeller to the lure body for driving the lure body in common rotation therewith, wherein said connecting means comprises a link, a central portion of said propeller includes an elongated slot, said link being in the form of a loop with a space between opposite sides thereof and said spaced sides extending through said slot so as to engage the propeller and to turn with the propeller, one end of the link being adapted for attachment to a lure.

4. An actuator as recited in claim 3, wherein one end of the link is adapted for attachment to a lure body and the other end of the link is adapted for attachment to a swivel connector.

References Cited

UNITED STATES PATENTS

| | | | |
|---|---|---|---|
| 801,649 | 10/1905 | Coffin | 43—42.51 |
| 1,701,528 | 2/1929 | Clewell | 43—42.16 |
| 1,889,707 | 11/1932 | Soltis et al. | 43—42.51 X |
| 2,610,429 | 9/1952 | Thomas | 43—42.17 |
| 3,017,716 | 1/1962 | Hawks | 43—42.16 |
| 3,192,660 | 7/1965 | Guess | 43—42.16 |
| 3,035,368 | 5/1962 | Collins | 43—42.51 X |

FOREIGN PATENTS

| | | |
|---|---|---|
| 403,114 | 9/1909 | France. |
| 4,122 | 1894 | Great Britain. |
| 1,199,944 | 6/1959 | France. |

SAMUEL KOREN, *Primary Examiner.*

J. H. CZERWONKY, *Assistant Examiner.*